United States Patent
Lesartre et al.

(10) Patent No.: US 10,972,394 B2
(45) Date of Patent: Apr. 6, 2021

(54) NETWORK CONGESTION MANAGEMENT

(71) Applicant: Hewlett Packard Enterprise Development LP, Houston, TX (US)

(72) Inventors: Gregg B. Lesartre, Fort Collins, CO (US); Derek Alan Sherlock, Boulder, CO (US); Nicholas George McDonald, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 86 days.

(21) Appl. No.: 15/939,532

(22) Filed: Mar. 29, 2018

(65) Prior Publication Data

US 2019/0306061 A1    Oct. 3, 2019

(51) Int. Cl.
| | |
|---|---|
| G01R 31/08 | (2020.01) |
| H04L 12/26 | (2006.01) |
| H04L 12/835 | (2013.01) |
| H04L 12/801 | (2013.01) |
| H04L 12/825 | (2013.01) |

(52) U.S. Cl.
CPC ............ H04L 47/12 (2013.01); H04L 47/25 (2013.01)

(58) Field of Classification Search
CPC ......... H04L 47/12; H04L 47/10; H04L 47/11; H04L 47/17; H04L 47/25; H04L 43/0882; H04L 43/065; H04L 47/24; H04L 47/522; H04L 43/0876; H04L 47/263; H04L 47/30; H04L 47/33; H04L 47/52; H04L 49/70; H04L 61/2592; H04L 12/5602; H04L 2012/5632; H04W 28/22; Y02D 50/10

USPC ............................................. 370/230
See application file for complete search history.

(56) References Cited

U.S. PATENT DOCUMENTS

| | | | | | |
|---|---|---|---|---|---|
| 5,457,687 | A | * | 10/1995 | Newman | H04L 12/5602 370/232 |
| 5,706,428 | A | * | 1/1998 | Boer | H04B 1/707 370/342 |
| 7,016,971 | B1 | * | 3/2006 | Recio | H04L 47/10 709/233 |

(Continued)

OTHER PUBLICATIONS

International Search Report and Written Opinion received for PCT Patent Application No. PCT/US2019/25052, dated Jul. 5, 2019, 11 pages.

(Continued)

Primary Examiner — Edan Orgad
Assistant Examiner — Vanneilian Lalchinthang
(74) Attorney, Agent, or Firm — Sheppard Mullin Richter & Hampton LLP (57) ABSTRACT

Example implementations relate to congestion management across a network fabric. An example implementation includes setting an uncongested sequence length threshold to a first value. A completed transaction received count may also be set to an initial value. The completed transaction received count may be incremented in response to a completion of a transaction request. In response to a detected congestion event, the injection rate may be decreased. A second value for the uncongested sequence length threshold may be determined from the CTR count, and the uncongested sequence length threshold may be set to the second value. Furthermore, in response to the CTR count being greater than or equal to the uncongested sequence length threshold, the injection rate may be increased.

20 Claims, 8 Drawing Sheets

(56) References Cited

U.S. PATENT DOCUMENTS

| | | | | |
|---|---|---|---|---|
| 8,520,517 | B2* | 8/2013 | Kwan | H04L 47/10 370/231 |
| 9,565,110 | B2* | 2/2017 | Mullendore | H04L 47/10 |
| 2005/0078603 | A1* | 4/2005 | Turner | H04L 47/263 370/235 |
| 2005/0108444 | A1* | 5/2005 | Flauaus | H04L 41/0853 710/15 |
| 2005/0286440 | A1* | 12/2005 | Strutt | H04L 47/10 370/253 |
| 2007/0053446 | A1* | 3/2007 | Spilo | H04L 1/0003 375/259 |
| 2012/0134260 | A1* | 5/2012 | Chou | H04L 43/0882 370/225 |
| 2016/0182328 | A1* | 6/2016 | Bhasin | H04L 43/067 709/224 |
| 2017/0324641 | A1* | 11/2017 | Ertugay | H04L 5/0055 |

OTHER PUBLICATIONS

Chrysos, N. et al., "Unbiased QCN for Scalable Server-Fabrics," (Research Paper), Feb. 10, 2014, 11 pages.

Pfister, G. et al., "Solving Hot Spot Contention Using Infiniband Architecture Congestion Control," (Research Paper), Jul. 7, 2005, 9 pages.

\* cited by examiner

NETWORK CONGESTION MANAGEMENT

BACKGROUND

A network may become congested with network traffic. The cause of network congestion may be due to any number of network bottlenecks. For example, network traffic may be directed from any number of source nodes to a destination node, and the link bandwidth to the destination node may be limited and overwhelmed with traffic. In another example, the processing speed of the destination node may be limited, such that the destination node cannot process data faster than it receives the data. A destination node may not keep pace with the data the destination node receives for a number of reasons, e.g. cache misses, memory bank conflicts, etc.

BRIEF DESCRIPTION OF THE DRAWINGS

Certain examples are described in the following detailed description and in reference to the drawings, in which.

DETAILED DESCRIPTION OF SPECIFIC EXAMPLES

To reduce network congestion, source nodes, communication redistribution points and/or communication end points for transmitting transaction requests, may be assigned congestion rates. Specifically, a source node may be assigned a rate at which the source node may inject traffic into the network. Where congestion occurs at a particular destination node, a source node sending traffic to the destination node may be throttled such that the injection rate of the source node is decreased to a lower rate. Once congestion is alleviated, the injection rate of the source node may be increased.

Any number of approaches may be implemented to detect network congestion. In an example instance, a congestion event may be determined at a destination node i.e. a node receiving network traffic. The congestion event may occur due to a threshold network latency, where the destination node exceeds a threshold number of received transactions within a given time, where the destination node exceeds a threshold number of received transactions within a buffer of the destination node to be processed, any combination thereof, and/or any other indicators of network congestion at the destination node. Responsive to identifying the occurrence of a congestion event, the destination node may mark transactions received at the destination node with a congestion indicator. The congestion indicator may accompany a transaction response from the destination node to indicate to a respective source node that the destination node experienced a congestion event.

Once network congestion is alleviated, the injection rate of transactions transmitted by the source node into the network may be increased. A number of approaches may be implemented to determine network congestion alleviation. As described above, a source node may receive transaction responses from a destination node. To determine when network congestion has been alleviated, the source node may track a number of transactions that have completed. The source node may compare the number of transactions completed without network congestion to an uncongested sequence threshold.

The time at which the injection rate of the source node is increased may be determined from the uncongested sequence length threshold. For instance, the injection rate of the source node may be increased where the number of transactions completed equals or is greater than the uncongested sequence threshold. In some implementations, the uncongested sequence length threshold may not be a fixed value. For instance, the uncongested sequence length threshold may be reset responsive to an increase or decrease of the source node injection rate. In some examples, the uncongested sequence length threshold may be set to a value that corresponds with a count of transactions completed as will be described in greater detail below.

Figure 1:
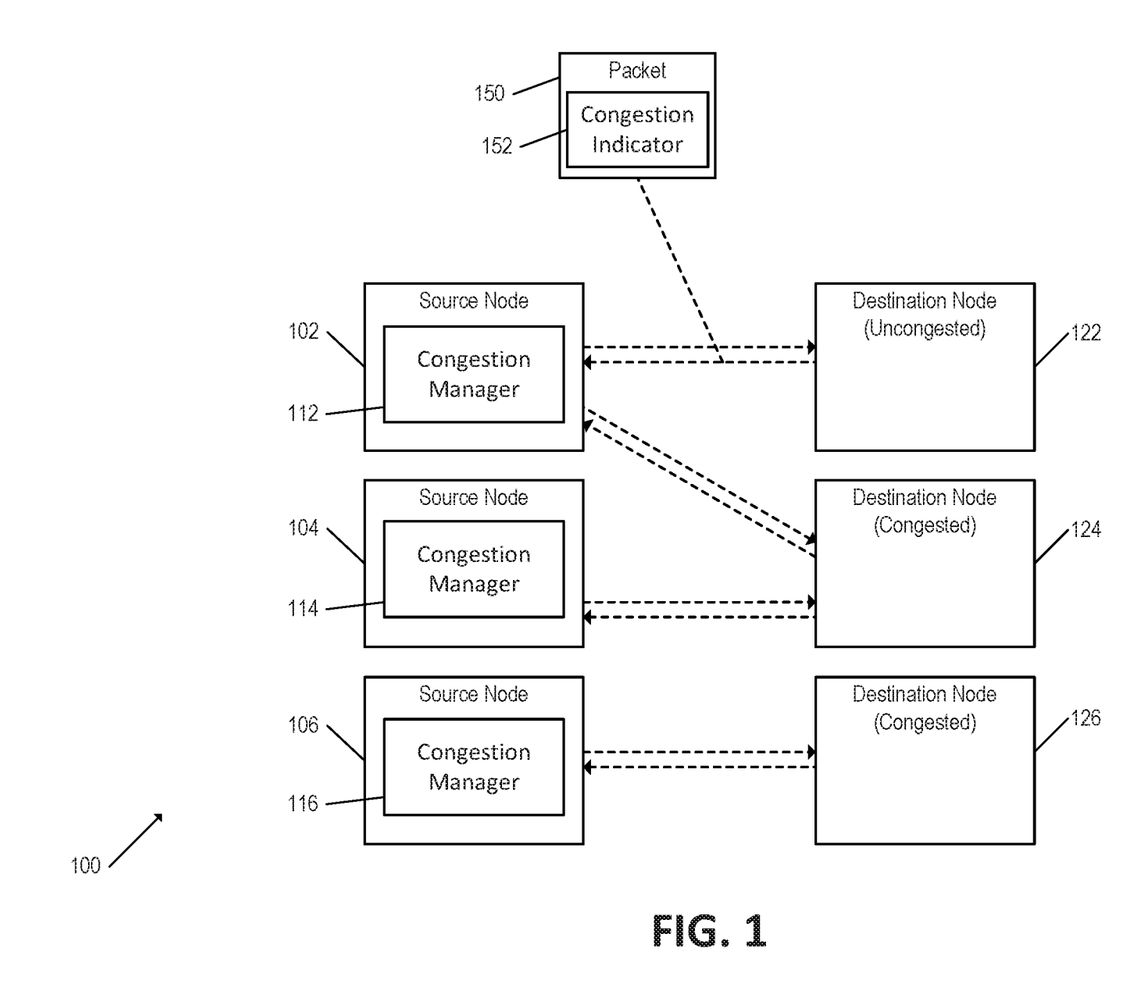
FIG. 1 is a block diagram of an example network system having managed network congestion.

FIG. 1 is a block diagram of an example network system fabric 100 having managed network congestion. FIG. 1 includes example source nodes 102-106 for transmitting transaction requests. Source nodes 102-106 may include congestion managers 112-116 having congestion management logic for managing congestion within the network system fabric. FIG. 1 further includes example destination nodes 122-126 for receiving transactions from source nodes 102-106 and transmitting transaction responses to source nodes 102-106. Three example source nodes 102-106 and three example destination nodes 122-126 are illustrated as part of the network fabric. However, a single node may be both a source node and a destination node, and any number of source nodes and/or destination nodes may be implemented within a network fabric.

Transactions may be transmitted to and from source nodes 102-106 in the form of a data packet, such as packet 150. Packet 150 may include a congestion indicator 152. Congestion indicator 152 may be a congestion bit to be marked by a destination node or another node of the fabric to indicate congestion. For example, a 1-bit congestion indicator may include a value of "1" where congestion is indicated, and a value of "0" where no congestion is indicated. A destination node may, for example, receive a transaction from a source node at a time when the destination node is congested. The destination node may transmit a transaction response having a congestion indicator marked with a value of "1" to the source node to alert the source node of the congested destination node. Conversely, the destination node may transmit a transaction response having a congestion indicator marked with a value of "0" to the source node to alert the source node that the destination node is uncongested.

Source nodes 102-106, as illustrated, include congestion managers 112-116 having congestion management logic. Congestion managers 112-116 may dynamically respond to congestion occurring at any of destination nodes 122-126 by changing the injection rate of a source node. For example, congestion manager 112 may increase or decrease the injection rate of source node 102, congestion manager 114 may increase or decrease the injection rate of source node 104, and/or congestion manager 114 may increase or decrease the injection rate of source node 106.

Any number of methods may be implemented for governing the change in injection rate of a source node. The injection rate of a source node may be increased and/or decreased by a percentage of the previous injection rate, and may be increased and/or decreased by a formula that controls whether the injection rate is increased and/or decreased linearly, exponentially, and/or by any other rate to optimize network response time while minimizing network congestion. As another example, the injection rate of a source node may be increased and/or decreased according to a series of incremental and discrete injection rates of a source node.

Figure 2:
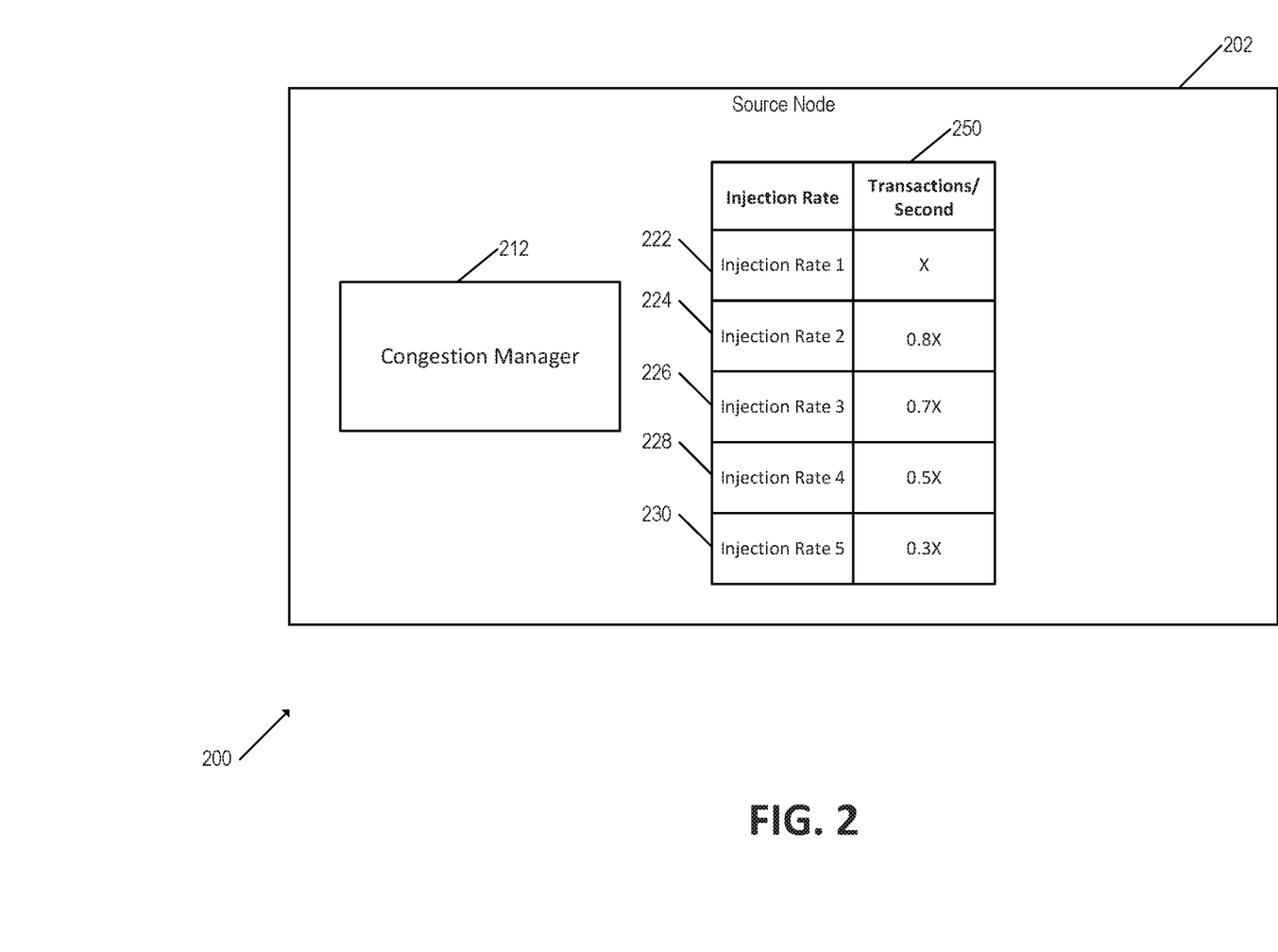
FIG. 2 is a block diagram illustrating an example source node having congestion managers to increase and/or decrease the injection rate of the source node.

FIG. 2 is a block diagram 200 illustrating an example source node 202 having congestion manager 212 to increase and/or decrease the injection rate of the source node 202 according to a series of incremental and discrete predetermined injection rates. Example injection rates are listed in table 250. Specifically, example injection rates 222-230 are listed in table 250. Although five example injection rates are illustrated, any number of discrete injection rates may be implemented within a source node. In this example, a higher injection rate corresponds to a greater number of transactions transmitted per second. For example, injection rate 1, 222 respectively, corresponds to an unthrottled rate of X transactions per second. The unthrottled rate may be a highest rate at which transactions may be transmitted from the source node, and in an example, may be a rate having no artificial constraints. Conversely, injection rates 2-5, 224-230 respectively, may be throttled rates that artificially constrain the rate at which source node 202 may inject transactions into the network. For example, injection rate 2, 224 respectively, may correspond to a rate of 0.8× transactions per second. Congestion manager 212 may determine the injection rate of source node 202, and may increase or decrease the current injection rate of source node 202 according to example table 250.

In some example implementations, the difference between discrete throttled injection rates of source node 202 may be determined by the proportion of traffic transmitted by source node 202 to a congested destination node. Injection rate differences determined from the proportion of traffic transmitted by a source node to a congested destination node enable a congested destination node to experience a consistent alleviation of congestion, regardless of the number of source nodes from which it receives transaction requests and regardless of the number of other destination nodes each source may be accessing.

Consider the following two example scenarios. In a first scenario, source node 202 may be part of a similar network fabric to that of example source node 106 of FIG. 1, and may be in communication with a single destination node, such as example destination node 126. In this first scenario, example source node 202 may be contributing 100% of the congestion experienced by destination node 126. The differences between injection rates of source node 202 may correspond to the injection rates illustrated in FIG. 2. Thus, congestion manager 212 may, for instance, throttle source node 202 from injection rate 2 at a rate of 0.8× transactions per second to injection rate 3 at a rate of 0.7× transactions per second where destination node 126 is congested.

In a second example scenario, source node 202 may be part of a similar network fabric to that of example source node 102 of FIG. 1, and may be in communication with a plurality of destination nodes, such as example destination node 122 and example congested destination node 124. In the second example scenario, source node 202 may be contributing to approximately 50% of the bandwidth at congested destination node 124. Thus, in the second scenario congestion manager 212 may throttle source node 202 by some percentage of the difference of injection rate 2 at a rate of 0.8× transactions per second to injection rate 3 at a rate of 0.7× transactions per second. Accordingly, the difference between discrete throttled injection rates of source node 202 may correspond to the proportion of traffic transmitted by source node 202 to a congested destination node relative to other destination nodes.

Figure 3:
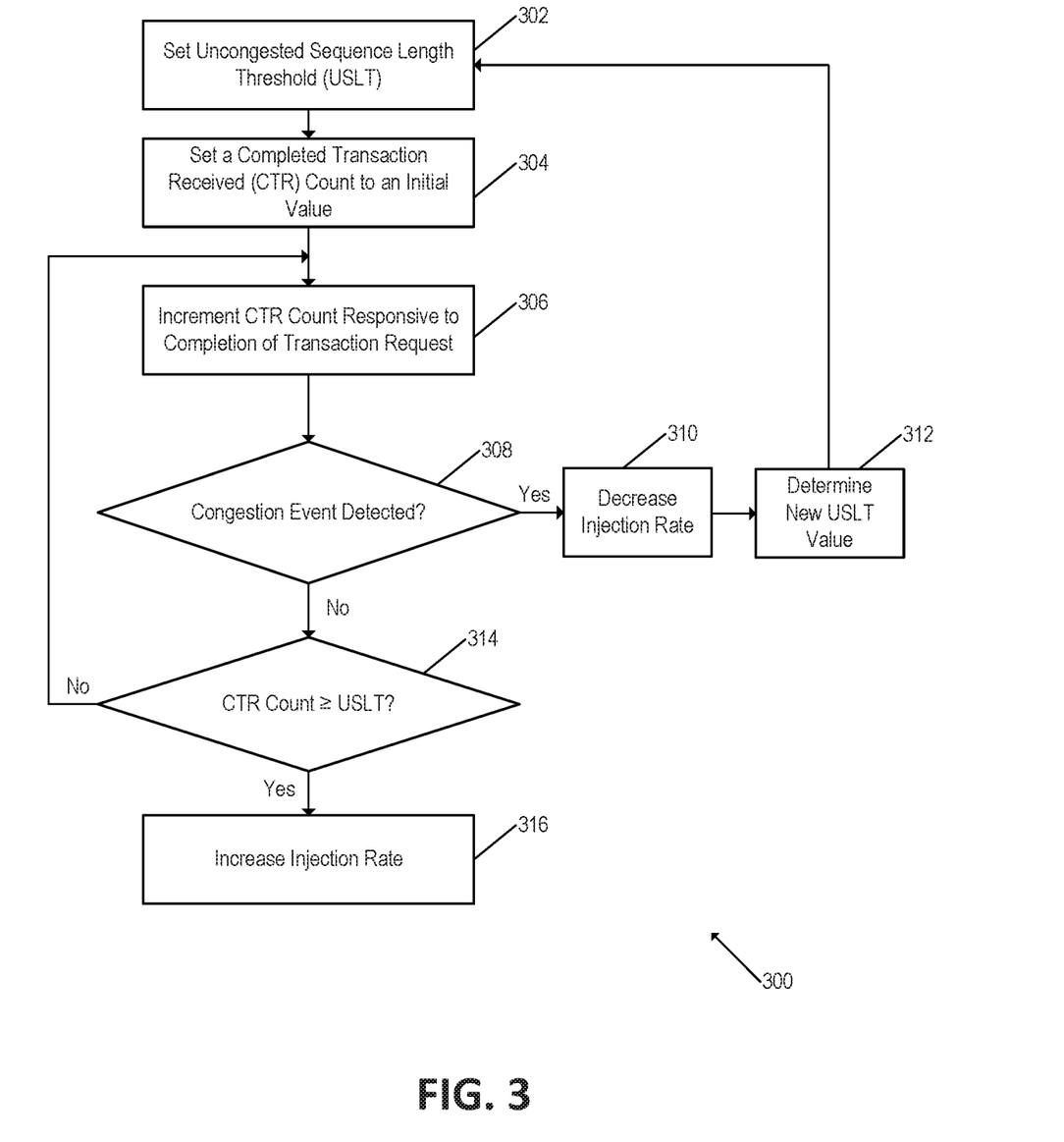
FIG. 3 is a flowchart illustrating a method for managing the injection rate of a source node.

FIG. 3 is a flowchart illustrating a method 300 for managing the injection rate of a source node. Execution of method 300 may be described below with reference to system 100 and system 200, and may be executed for example, by any of congestion managers 112, 114, 116, and/or 212 of system 100 and 200 respectively. However, other suitable components for execution of method 300 may be utilized. Additionally, the components for executing method 300 may spread among multiple devices. Method 300 may be implemented in the form of executable instructions stored on a machine-readable storage medium and/or in the form of electronic circuitry, e.g. hardware. In some examples, steps of method 300 may be executed substantially concurrently or in a different order than shown in FIG. 3. In some examples, method 300 may include more or less steps than are shown in FIG. 3. In some examples, some of the steps of method 300 may, at certain times, be ongoing and/or may repeat.

The injection rate of a source node may be throttled, i.e. decreased, to alleviate congestion in a network, but may result in slower transaction completion times. An uncongested sequence length threshold may be a value utilized to determine when the injection rate of a source node may be increased. At block 302, an uncongested sequence length threshold of a source node may be set. For example, congestion manager 212 may set an uncongested sequence length threshold for source node 202, and/or for another network node.

A completed transaction received (CTR) count may further be utilized and compared against the uncongested sequence length threshold to determine when the injection rate of a source node may be increased. At block 304, the CTR count may be set to an initial value such as the value 0, or any other value at which the CTR count may be initialized. At block 306, the CTR may be incremented in response to a transaction request completing. For example, where the CTR count is incremented at a source node, the CTR count may be incremented in response to receiving a transaction response at the source node from a destination node indicating completion of the transaction request.

At block 308, it may be determined whether a congestion event was detected. As indicated above, a congestion event may occur for a variety of reasons resulting in transaction completion delays and/or transaction request failures. A congestion event may indicate congestion across a network fabric, and in some examples, at a particular destination node. Responsive to identifying the occurrence of congestion, a destination node may mark transactions received at the destination node with a congestion indicator. The congestion indicator may accompany a transaction response from the destination node to indicate to respective source nodes that the destination node experienced a congestion event. Thus, the congestion event may be detected at the destination node and/or the source node.

Other methods may be utilized to detect a congestion event at a network node. In some example implementations, a congestion event may be detected when a source node transmits a transaction request and does not receive a transaction response within a designated period of time, such as a designated period of time for the transaction request to traverse the network fabric. In some examples, the source node may retransmit the transaction request after not receiving a transaction response within the designated period of time. In this example, a congested event may be determined from a threshold number of retransmissions of a particular transaction request without receiving a transaction response.

A source node may be throttled when a congestion event is detected. At block 310, the injection rate of a source node may be decreased in response to a detected congestion event. To illustrate in reference to FIG. 2, congestion manager 212 may detect a congestion event, and in response decrease the injection rate of source node 202 according to the discrete injection rates listed in example table 250, or by any other formula for increasing and/or decreasing a source node injection rate.

At block 312, a new uncongested sequence length threshold value may be determined. As will be described below, an uncongested sequence length threshold may be utilized to determine when an injection rate of a source node may be increased. The new uncongested sequence length threshold value may be determined from a function of the current CTR count. For instance, in response to the detected congestion event, the new uncongested sequence length threshold value may be set to the current CTR count, to a multiple or fraction of the current CTR count, and/or any other function as determined from the CTR count.

In another example, the new uncongested sequence length threshold value may be determined from a function of the current CTR count and the previous uncongested sequence length threshold. The previous uncongested sequence length threshold may likewise be a function of a previous CTR count and a previous uncongested sequence length threshold. Thus, the new uncongested sequence length threshold value may be determined from both the current CTR value as well as previous CTR values. In some example implementations, the new uncongested sequence length threshold value may be a weighted or unweighted average of the current CTR value and previous CTR values. Determination of the new uncongested sequence length threshold value at block 312 may be followed by a return to block 302, at which point the new uncongested sequence length threshold value may be set. The uncongested sequence length threshold may thus be dynamically adapted based on a history of completed transaction requests. Accordingly, current and/or previous CTR values may be utilized to determine a new uncongested sequence threshold value.

It may be determined at block 314 whether the CTR count is greater than or equal to the uncongested sequence length threshold. A negative determination at block 314 may be followed by a return to block 306. A positive determination at block 314 may be followed by an increase to a source node injection rate at block 316. Thus, the CTR count may be incremented until either, a congestion event is detected, or, if no congestion event is detected prior to the CTR count being greater than or equal to the uncongested sequence length threshold, an injection rate is increased. Accordingly, an uncongested sequence length threshold may be utilized to determine when an injection rate of a source node may be increased.

Figure 4:
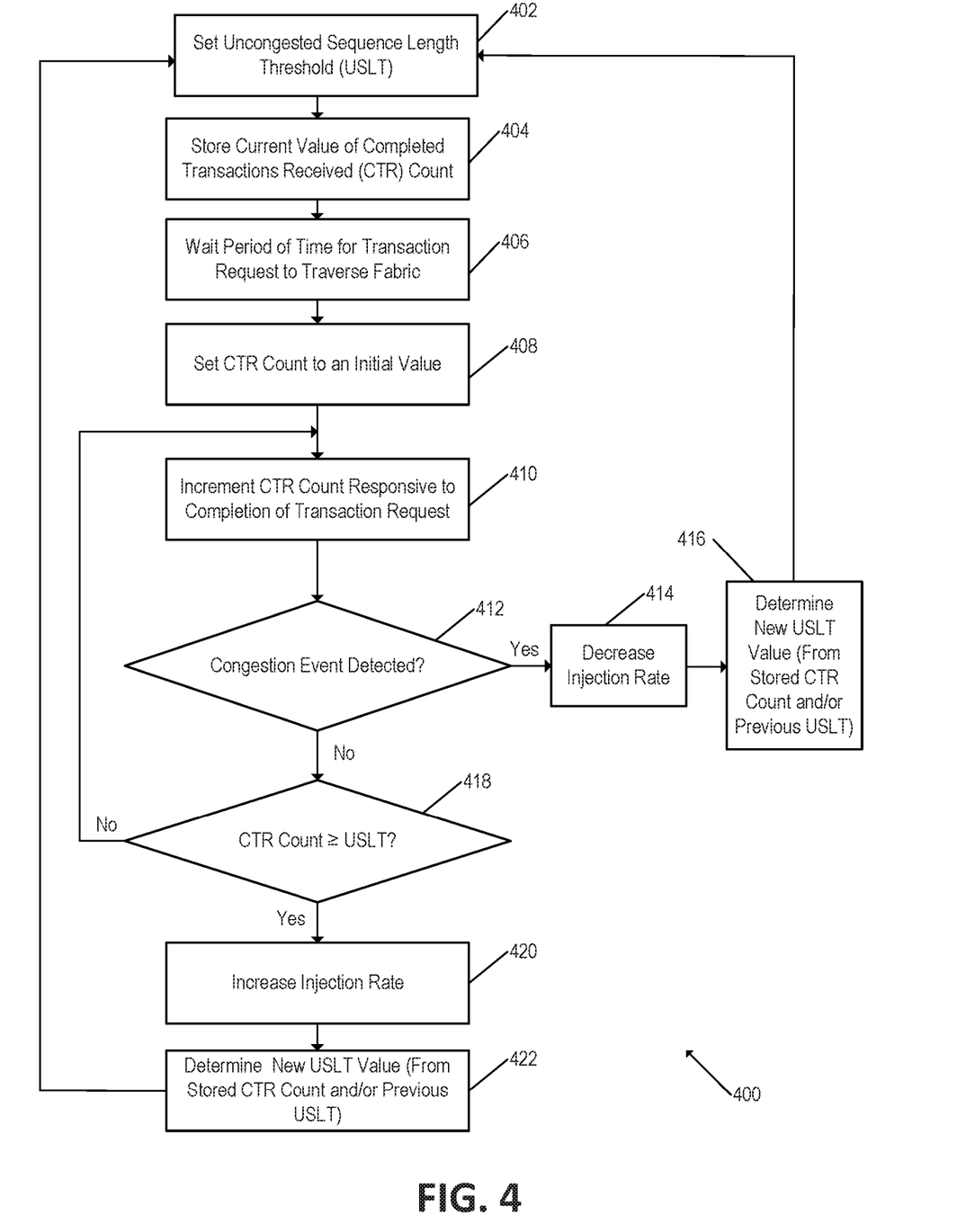
FIG. 4 is a flowchart illustrating another method for managing the injection rate of a source node.

FIG. 4 is a flowchart illustrating another method 400 for managing the injection rate of a source node. Execution of method 400 may be described below with reference to system 100 and system 200, and may be executed for example, by any of congestion managers 112, 114, 116, and/or 212 of system 100 and 200 respectively. However, other suitable components for execution of method 400 may be utilized. Additionally, the components for executing method 400 may spread among multiple devices. Method 400 may be implemented in the form of executable instructions stored on a machine-readable storage medium and/or in the form of electronic circuitry, e.g. hardware. In some examples, steps of method 400 may be executed substantially concurrently or in a different order than shown in FIG. 4. In some examples, method 400 may include more or less steps than are shown in FIG. 4. In some examples, some of the steps of method 400 may, at certain times, be ongoing and/or may repeat.

At block 402, an uncongested sequence length threshold of a source node may be set. For example, congestion manager 212 may set an uncongested sequence length threshold for source node 202, and/or for another network node. At block 404, a completed transactions received (CTR) count may be stored.

A period of time may pass for a transaction request transmitted by the source to traverse the fabric prior to setting the CTR count to an initial value. The effect of decreasing the injection rate at block 414 may be realized across the network fabric after the period of time. In some examples, a time period for a transaction request to have traversed the fabric is a time sufficient for a transaction request to be transmitted by a source node, received at a destination node, and returned as a transaction response to the source node. In some example implementations, a time period for a transaction request to have traversed the fabric is equivalent to a time-to-live of a transaction request. In another example, the period of time may correspond to a time for a number of transactions equivalent to the proportion of traffic transmitted by a source node to a congested destination node to traverse the fabric. For example, source node 102 of FIG. 1 may transmit transaction requests to uncongested destination node 122 and congested destination node 124. Because source node 102 transmits traffic to two destination nodes, 122 and 124 respectively, the period of time may correspond to a time for two transactions to traverse the fabric, or any multiple of two transactions. After this period of time, the effects of decreasing the injection rate may be realized across the network fabric.

Once the period of time has transpired, the CTR count may be set to an initial value at block 408, and at block 410, the CTR may be incremented in response to a transaction request completing. At block 412, it may be determined whether a congestion event was detected. Upon detecting a congestion event, a source node may be throttled. At block 414, the injection rate of a source node may be decreased in response to the detected congestion event.

At block 416, a new uncongested sequence length threshold value may be determined. The new uncongested sequence length threshold value may be determined from a function of the current CTR count, and may be determined from the value of the current CTR count, from a multiple or fraction of the current CTR count, and/or from any other function of the CTR count. In some example implementations, the new uncongested sequence length threshold value may be determined from a function of the current CTR count and a stored CTR count. In some example implementations, the new uncongested sequence length threshold value may be a weighted or unweighted average of the current CTR value and a stored CTR value. Determination of the new uncongested sequence length threshold value at block 416 may be followed by a return to block 402, at which point the new uncongested sequence length threshold value may be set. Accordingly, current and/or previous CTR values may be utilized to determine a new uncongested sequence threshold value.

It may be determined at block 418 whether the CTR count is greater than or equal to the uncongested sequence length threshold. A negative determination at block 418 may be followed by a return to block 410. A positive determination at block 418 may be followed by an increase to a source node injection rate at block 420. Thus, the CTR count may incremented until either, a congestion event is detected, or, if no congestion event is detected prior to the CTR count being greater than or equal to the uncongested sequence length threshold, an injection rate is increased.

At block 422, a new uncongested sequence length threshold value may be determined upon increasing the injection rate at block 420. The new uncongested sequence length threshold value may be determined from a function of the current CTR count, and may be determined from the value of the current CTR count, from a multiple or fraction of the current CTR count, and/or from any other function of the CTR count. In some example implementations, the new uncongested sequence length threshold value may be determined from a function of the current CTR count and a stored CTR count. In some example implementations, the new uncongested sequence length threshold value may be determined from a function of a current CTR count, the previous uncongested sequence length threshold, a stored CTR count, and/or any combination thereof. In some example implementations, the new uncongested sequence length threshold value may be a weighted or unweighted average of the current CTR value, and/or prior CTR values. In some example implementations, the uncongested sequence length threshold value may remain unchanged in response to increasing the injection rate at block 420. Determination of the new uncongested sequence length threshold value at block 422 may be followed by a return to block 402, at which point the new uncongested sequence length threshold value is set.

Figure 5:
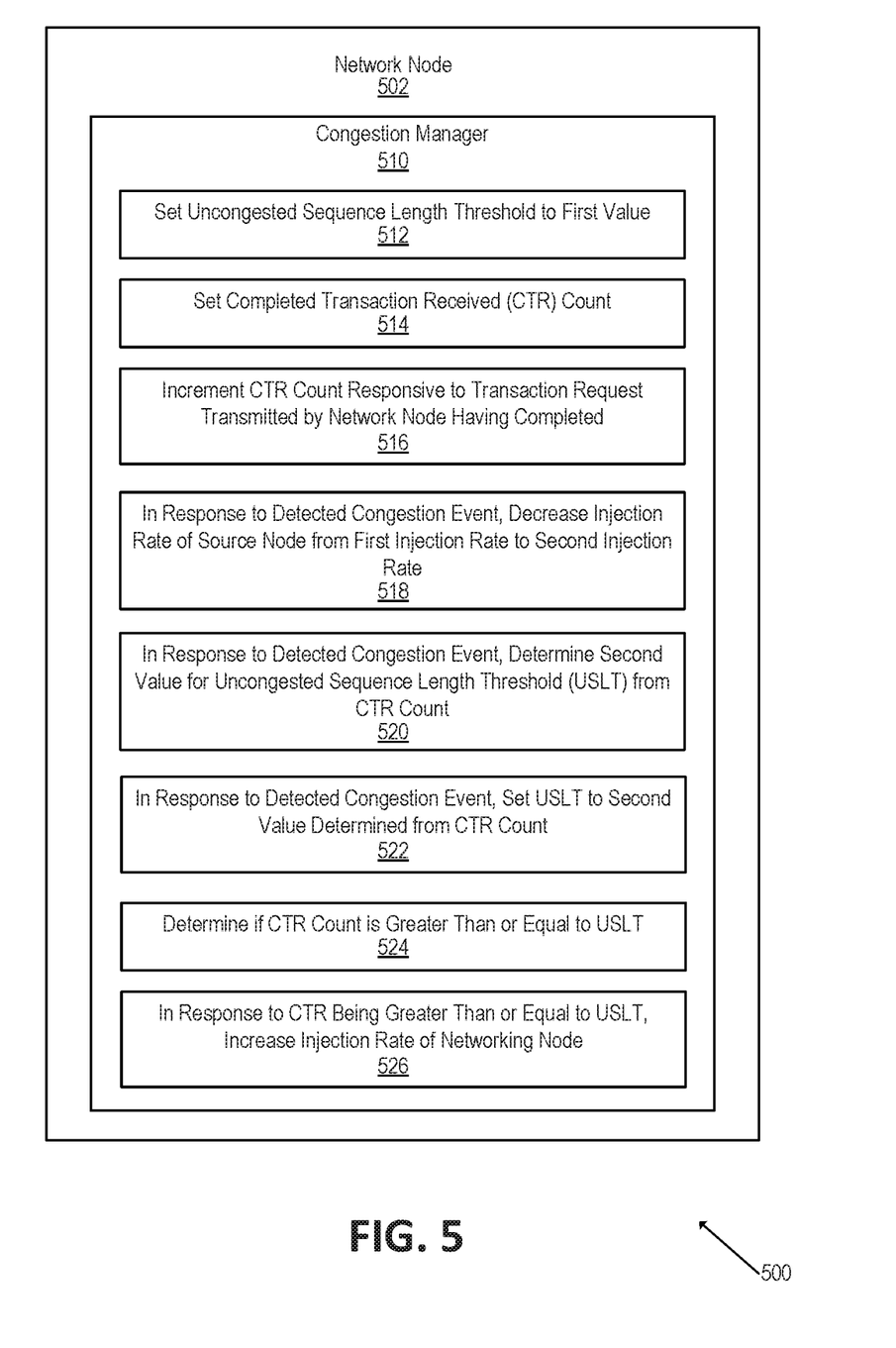
FIG. 5 is a block diagram illustrating a network node for managing a network node injection rate.

FIG. 5 is a block diagram 500 illustrating a network node 502 including a congestion manager 510 for managing a network node injection rate. Network node 502 may be implemented as hardware or a combination of hardware and software/firmware and may be in communication with other networks nodes over a network fabric. Similarly, congestion manager 510 may be implemented as hardware or a combination of hardware and software/firmware. For example, congestion manager 510 may be implemented as logical circuitry, processing circuitry (such as central processing units (CPUs), microprocessors, microcontroller devices, digital signal processors (DSPs), etc.) executing machine readable instructions stored in non-transitory machine readable media, application-specific integrated circuits (ASICs), field-programmable gate arrays (FPGAs), application-specific instruction set processors (ASIPs), and/or the like, in any combination of the aforementioned physical structures, some of which may be shared. Furthermore, the logical circuitry and/or processing circuitry of congestion manager 510 may be implemented as a single component, or split among multiple components.

Blocks 512-528 illustrate the logic to be executed by congestion manager 510. While blocks 512-528 are described below in a particular sequence, blocks 512-528 may be executed substantially concurrently or in a different order than shown in FIG. 5. At block 512, congestion manager 510 may set an uncongested sequence length threshold to a first value. For example, congestion manager 510 may set an uncongested sequence length threshold for network node 502.

At block 514, a completed transaction received (CTR) count may be set to an initial value, and at block 516, the CTR may be incremented in response to a transaction request completing. It may be determined whether a congestion event was detected. A source node may be throttled upon detecting a congestion event. At block 518, the injection rate of a source node may be decreased in response to the detected congestion event.

At block 520, a new uncongested sequence length threshold value may be determined in response to the detected congestion event. The new uncongested sequence length threshold value may be determined from a function of the current CTR count, and may be determined from the value of the current CTR count, from a multiple or fraction of the current CTR count, and/or from any other function of the CTR count. In some example implementations, the new uncongested sequence length threshold value may be determined from a function of the current CTR count and a stored CTR value. In some example implementations, the new uncongested sequence length threshold value may be a weighted or unweighted average of the current CTR value and a stored CTR value.

Once a new uncongested sequence length threshold value is determined, the uncongested sequence length threshold may be set to the new value. At block 522, a new uncongested sequence length threshold value is set.

At block 524, it may be determined that the CTR count is greater than or equal to the uncongested sequence length threshold. At block 526, the injection rate of source node 502 may be increased responsive to the determination. Accordingly, an injection rate of a source node may be managed according to a transaction completion history.

Figure 6:
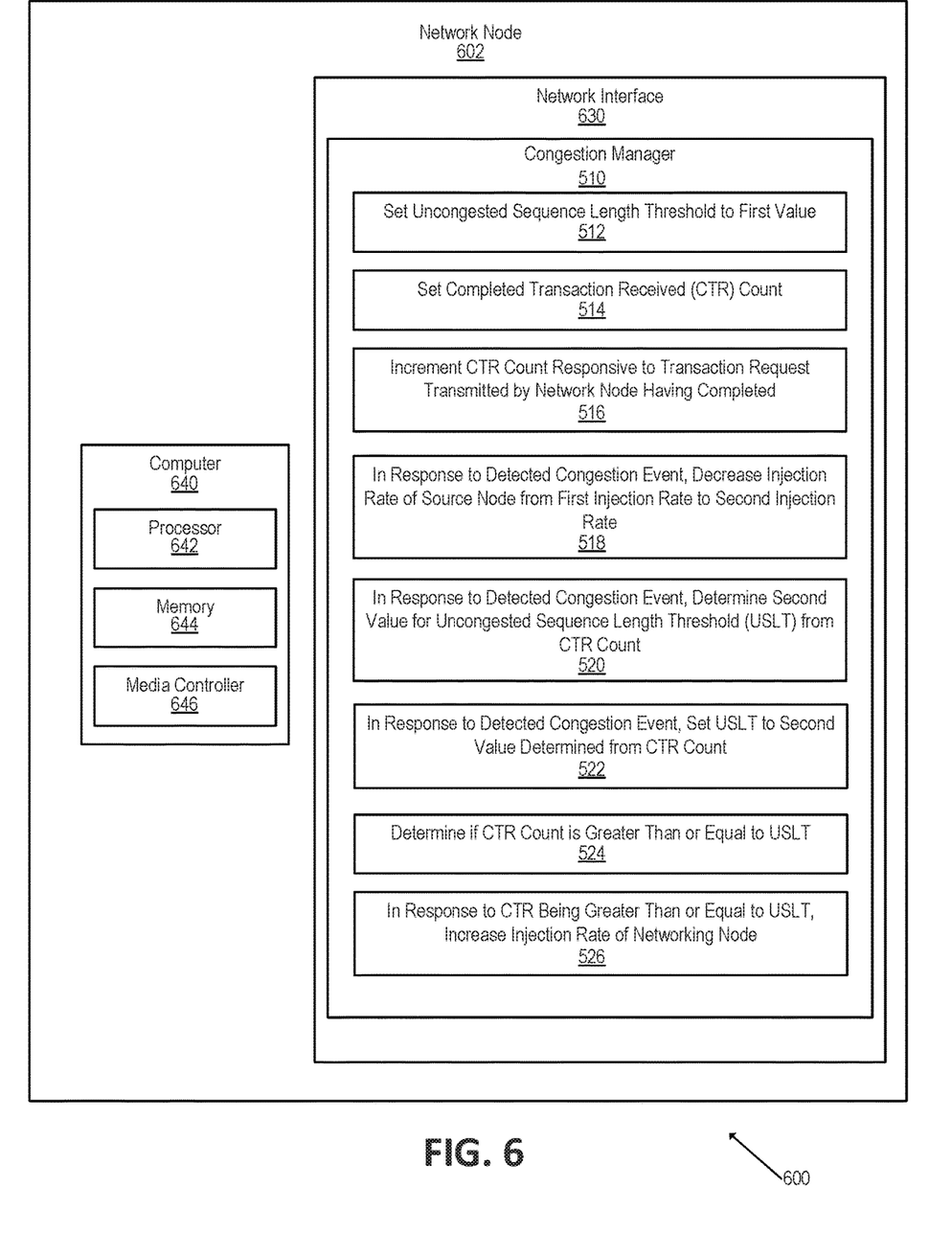
FIG. 6 is a block diagram illustrating an example network node for managing network fabric congestion.

FIG. 6 is a block diagram 600 illustrating an example of a network node 602 having a congestion manager 610 for managing network fabric congestion. Network node 602 may include similar architecture to network node 502 of FIG. 5, including congestion manager 510 having blocks 512-526. Blocks 512-526, as detailed above, illustrate logic to be executed by congestion manager 510. In this example, congestion manager 510 may be included in a network interface 630 of network node 602. Network interface 630 may provide access to a network. For example, transactions may be transmitted across a network from network interface 630, and the rate at which transactions are injected into the network may be controlled by congestion manager 510 of network interface 630.

Network node 602 may further include a computer 640 having a processor 642 and memory 644 coupled to network interface 630. The computer 640 may run an application, for example, and network interface 630 may enable the application to access the network via network interface 630. Computer 640 may also include a media controller 646 coupled to network interface 620. Specifically, media controller 646 may communicate data stored in memory 644 over the network via network interface 630. Media controller 646 may include hardware and/or a combination of hardware and/or software. The rate at which media controller 646 may communicate data over the network may be managed by congestion manager 510 according to the logic described in blocks 512-526.

Figure 7:
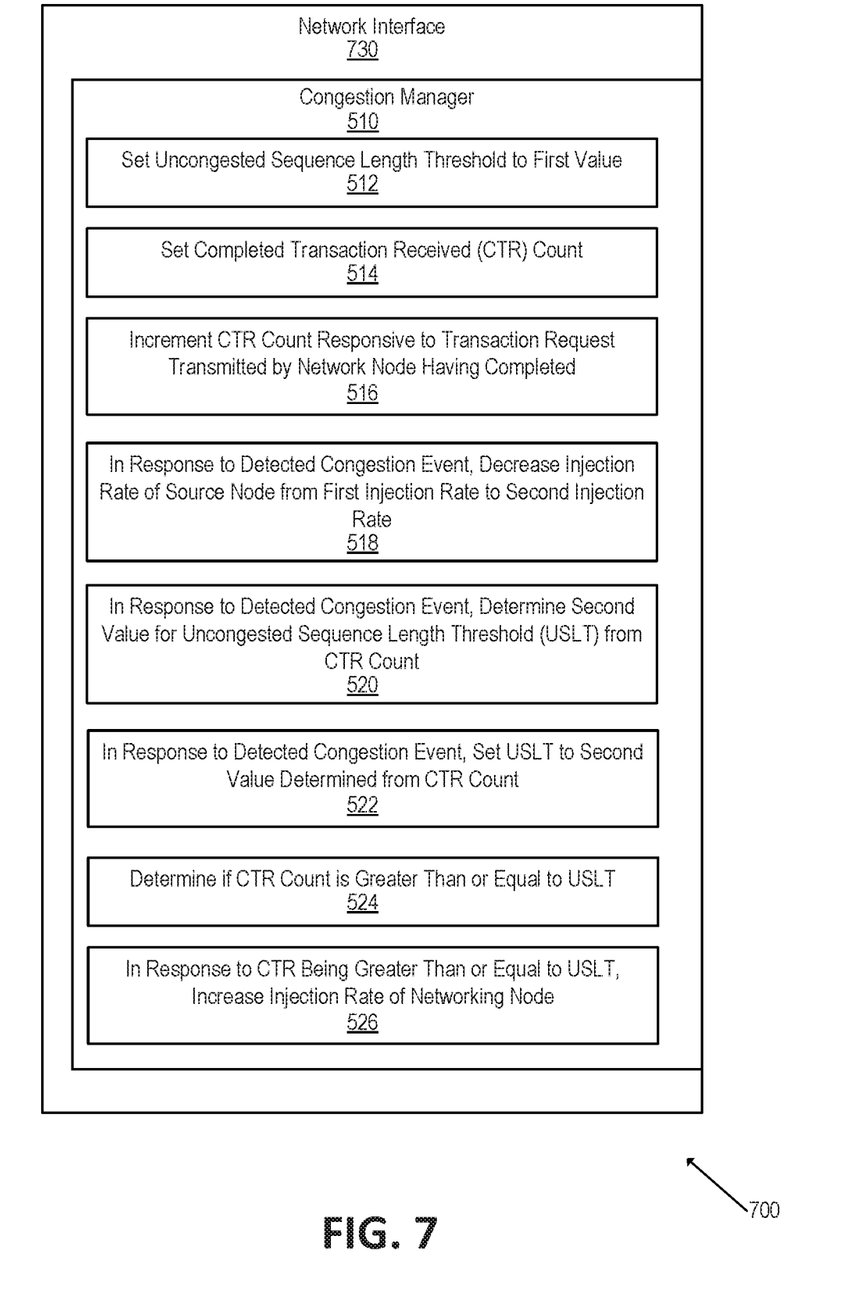
FIG. 7 is a block diagram illustrating an example of a network interface for managing network fabric congestion.

FIG. 7 is a block diagram 700 illustrating an example of a network interface 730. Network interface 730 may include similar architecture to network interface 630 of FIG. 6, including congestion manager 510 having blocks 512-526.

Blocks 512-526, as detailed above, illustrate logic to be executed by congestion manager 510 to manage congestion across the network fabric.

Figure 8:
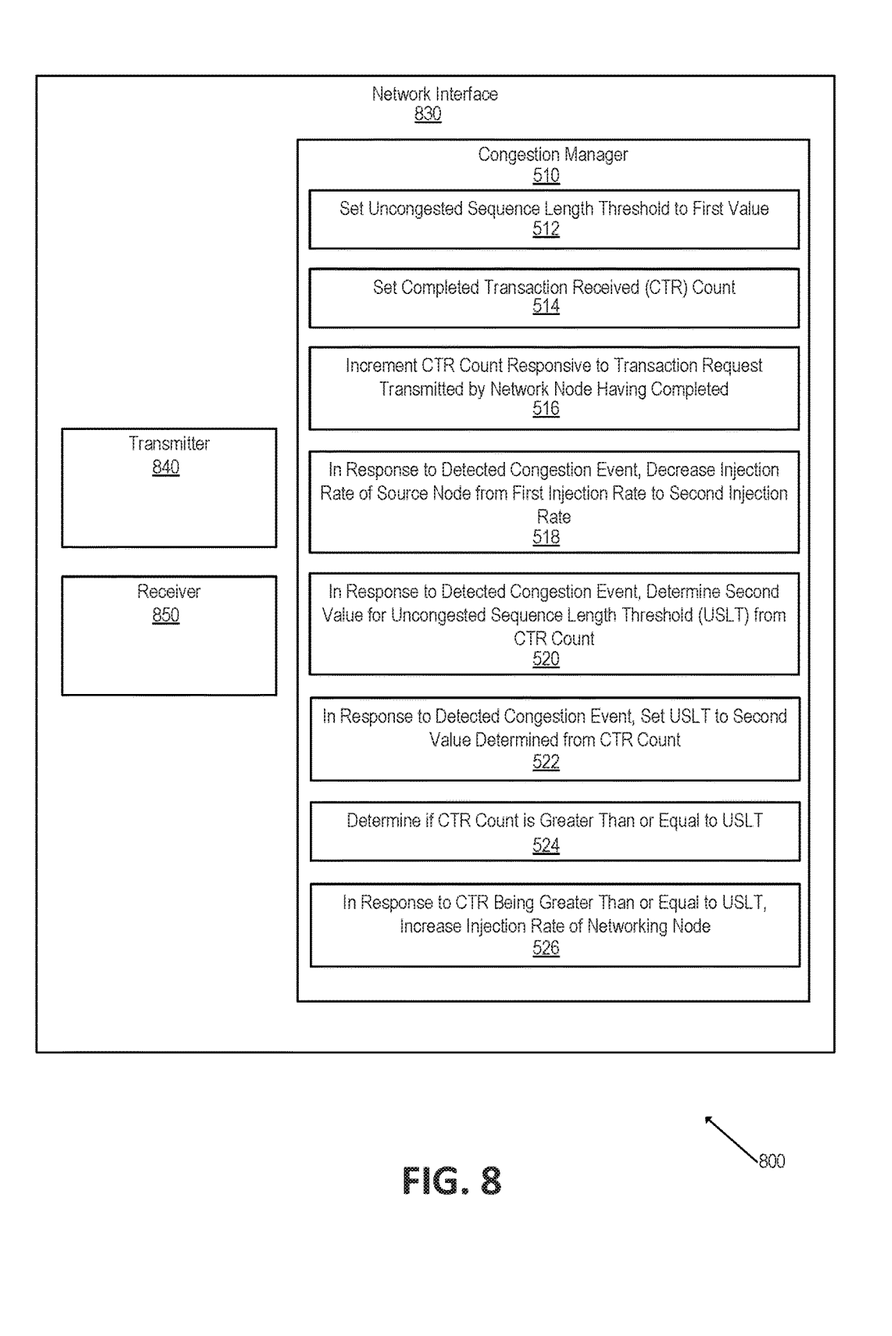
FIG. 8 is a block diagram illustrating another example of a network interface for managing network fabric congestion.

FIG. 8 is a block diagram 800 illustrating an example of a network interface 830. Network interface 830 may include similar architecture to network interface 630 of FIG. 6, including congestion manager 510 having blocks 512-526. Blocks 512-526, as detailed above, illustrate logic to be executed by congestion manager 510 to manage congestion across the network fabric.

Network interface 830 may further include a transmitter 840 to transmit transaction requests and/or transaction responses and a receiver to receive transaction requests and/or transaction responses. Transmitter 840 and/or receiver 850 may include hardware or a combination of hardware and/or software. As described above and with respect to block 516, a completed transaction received (CTR) count may be incremented responsive to a transaction request having completed, which, in some examples, is confirmed through receipt of a transaction response, i.e. at receiver 850. Furthermore, transmitter 840 may transmit transaction requests at an injection rate determined by congestion manager 510. Accordingly, network interface 830 may transmit and receive transaction requests and/or transaction responses, as well as manage the rate at which transaction requests and/or transaction requests are transmitted.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A method comprising:
setting an uncongested sequence length threshold to a first value;
setting a completed transaction received (CTR) count to an initial value;
incrementing the CTR count in response to completion of a transaction request;
in response to a detected congestion event,
  decreasing an injection rate such that the decreased injection rate corresponds to a proportion of traffic transmitted by a source node to a congested destination node relative to other destination nodes;
  determining a second value for the uncongested sequence length threshold from the CTR count; and
  setting the uncongested sequence length threshold to the second value; and
in response to the CTR count being greater than or equal to the uncongested sequence length threshold, increasing the injection rate.

2. The method of claim 1, wherein the injection rate is decreased from a first injection rate to a second injection rate, the first injection rate and the second injection rate determined from a series of incremental and discrete injection rates, wherein a difference between the first injection rate and the second injection rate is determined by the series of incremental and discrete injection rates and the proportion of traffic transmitted by the source node to the congested destination node relative to other destination nodes, wherein the proportion of traffic comprises a contributed bandwidth.

3. The method of claim 1, further comprising, after decreasing the injection rate and before setting the CTR count, waiting a period of time long enough for the transaction request to traverse a network fabric.

4. The method of claim 1, further comprising storing a current value of the CTR count prior to setting the CTR count.

5. The method of claim 4, wherein the uncongested sequence length threshold second value is a function of a stored CTR value and a CTR count.

6. The method of claim 1, wherein the uncongested sequence length threshold second value is a function of the uncongested sequence length threshold first value and the CTR count.

7. The method of claim 1, further comprising setting the uncongested sequence length threshold to a third value responsive to increasing the injection rate of the source node, wherein the third value is determined from the CTR count.

8. The method of claim 1, wherein the transaction request is completed when a response to the transaction request is received at the source node.

9. The method of claim 1, wherein the detected congestion event is detected responsive to a transaction response received at the source node indicating congestion.

10. The method of claim 1, wherein the detected congestion event is detected after not receiving a transaction response within a designated period of time.

11. A network node comprising:
a congestion manager to:
  set an uncongested sequence length threshold to a first value;
  set a completed transaction received (CTR) count;
  increment the CTR count responsive to a transaction request transmitted by the network node having completed;
  in response to a detected congestion event,
    decrease an injection rate of the network node from a first injection rate to a second injection rate such that the decreased injection rate corresponds to a proportion of traffic transmitted by the network node to a congested network node relative to other network nodes;
    determine a second value for the uncongested sequence length threshold from the CTR count; and
    set the uncongested sequence length threshold to the second value, wherein the second value is determined from the CTR count;
  determine if the CTR count is greater than or equal to the uncongested sequence length threshold; and
  in response to the CTR count being greater than or equal to the uncongested sequence length threshold, increase the injection rate of the network node; and
  reset the CTR count.

12. The network node of claim 11, further comprising a network interface to access a network, the network interface including the congestion management logic.

13. The network node of claim 12, further comprising a computer having a processor and memory coupled to the network interface such that an application running on the computer can access the network via the network interface.

14. The network node of claim 12, further comprising a media controller and a memory, the media controller and the memory coupled to the network interface such that the media controller can communicate data stored in the memory over the network via the network interface.

15. A network interface comprising:

a transmitter to transmit a transaction request over a network fabric; and a congestion manager to:

set an uncongested sequence length threshold to a first value;

set a completed transaction received (CTR) count to an initial value;

increment the CTR count in response to the transaction request transmitted by the transmitter having completed;

responsive to a detected congestion event, decrease an injection rate from a first injection rate to a second injection rate such that the decreased injection rate corresponds to a proportion of traffic transmitted by source nodes to respective congested destination nodes relative to uncongested destination nodes;

set the uncongested sequence length threshold to a second value, wherein the second value is determined from the CTR count; and determine if the CTR count is greater than or equal to the uncongested sequence length threshold; and responsive to the CTR count being greater than or equal to the uncongested sequence length threshold, increase the injection rate.

16. The network interface of claim 15, wherein the uncongested sequence length threshold second value is a function of the CTR and the uncongested sequence length threshold first value.

17. The network interface of claim 15, further comprising a receiver to receive a transaction response over the network fabric, wherein the detected congestion event is detected responsive to a transaction response received by the receiver indicating congestion or after the receiver has not received a transaction response within a designated period of time.

18. The network interface of claim 15, further comprising a receiver to receive the transaction response over the network fabric, wherein a transaction request is completed when a response to the transaction request is received by the receiver.

19. The network interface of claim 15, further comprising storing a current value of the CTR count prior to setting the CTR count to the initial value.

20. The network interface of claim 19, wherein the uncongested sequence length threshold second value is a function of the stored CTR value and the CTR count.

* * * * *